United States Patent
Meshi et al.

(10) Patent No.: US 11,316,872 B2
(45) Date of Patent: *Apr. 26, 2022

(54) MALICIOUS PORT SCAN DETECTION USING PORT PROFILES

(71) Applicant: PALO ALTO NETWORKS (ISRAEL ANALYTICS) LTD., Tel Aviv (IL)

(72) Inventors: Yinnon Meshi, Kibbutz Revivim (IL); Idan Amit, Ramat Gan (IL); Jonathan Allon, Haifa (IL); Aviad Meyer, Hod-Hasharon (IL)

(73) Assignee: PALO ALTO NETWORKS (ISRAEL ANALYTICS) LTD., Tel Aviv (IL)

( * ) Notice: Subject to any disclaimer, the term of this patent is extended or adjusted under 35 U.S.C. 154(b) by 429 days.

This patent is subject to a terminal disclaimer.

(21) Appl. No.: 16/261,634

(22) Filed: Jan. 30, 2019

(65) Prior Publication Data

US 2020/0244675 A1    Jul. 30, 2020

(51) Int. Cl.
*H04L 29/06* (2006.01)

(52) U.S. Cl.
CPC ...... *H04L 63/1416* (2013.01); *H04L 63/1475* (2013.01)

(58) Field of Classification Search
CPC . H04L 63/00; H04L 63/1416; H04L 63/1475; H04L 2463/146; H04W 12/00; G06F 21/00
See application file for complete search history.

(56) References Cited

U.S. PATENT DOCUMENTS

| 5,991,881 A | 11/1999 | Conklin et al. |
| 6,347,374 B1 | 2/2002 | Drake et al. |
| 7,178,164 B1 | 2/2007 | Bonnes |

(Continued)

FOREIGN PATENT DOCUMENTS

| EP | 0952521 A2 | 10/1999 |
| EP | 2056559 A1 | 5/2009 |
| WO | 03083660 A1 | 10/2003 |

OTHER PUBLICATIONS

U.S. Appl. No. 15/955,712 office action dated Dec. 31, 2019.
(Continued)

*Primary Examiner* — Baotran N To
*Assistant Examiner* — Leynna Truvan
(74) *Attorney, Agent, or Firm* — Kligler & Associates Patent Attorneys Ltd

(57) ABSTRACT

Methods, apparatus and computer software products implement embodiments of the present invention that include defining, for a given software category, respective, disjoint sets of communication ports that are used by each of a plurality of software systems in the given software category, including at least first and second disjoint sets. A set of port scans are identified in data traffic transmitted between multiple nodes that communicate over a network, each of the port scans including an access, in the data traffic, of a plurality of the communication ports on a given destination node by a given source node during a predefined time period. Upon detecting a port scan by one of the nodes including accesses of at least one of the communication ports in the first set and at least one of the communication ports in the second set, a preventive action is initiated.

19 Claims, 7 Drawing Sheets

(56) References Cited

U.S. PATENT DOCUMENTS

| | | |
|---|---|---|
| 7,181,769 B1 | 2/2007 | Keanini et al. |
| 7,523,016 B1 | 4/2009 | Surdulescu et al. |
| 7,694,150 B1 | 4/2010 | Kirby |
| 7,703,138 B2 | 4/2010 | Desai et al. |
| 7,712,134 B1 | 5/2010 | Nucci et al. |
| 7,752,665 B1 | 7/2010 | Robertson et al. |
| 7,908,655 B1 | 3/2011 | Bhattacharyya et al. |
| 8,245,298 B2 | 8/2012 | Pletka et al. |
| 8,397,284 B2 | 3/2013 | Kommareddy et al. |
| 8,429,180 B1 | 4/2013 | Sobel et al. |
| 8,490,190 B1 | 7/2013 | Hernacki et al. |
| 8,516,573 B1 | 8/2013 | Brown et al. |
| 8,555,388 B1 | 10/2013 | Wang et al. |
| 8,607,353 B2 | 12/2013 | Rippert, Jr. et al. |
| 8,620,942 B1 | 12/2013 | Hoffman et al. |
| 8,677,487 B2 | 3/2014 | Balupari et al. |
| 8,762,288 B2 | 6/2014 | Dill |
| 8,769,681 B1 | 7/2014 | Michels et al. |
| 8,925,095 B2 | 12/2014 | Herz et al. |
| 8,966,625 B1 | 2/2015 | Zuk |
| 9,038,178 B1 | 5/2015 | Lin |
| 9,118,582 B1 * | 8/2015 | Martini .................. H04L 67/02 |
| 9,147,071 B2 | 9/2015 | Sallam |
| 9,231,962 B1 | 1/2016 | Yen et al. |
| 9,342,691 B2 | 5/2016 | Maestas |
| 9,378,361 B1 | 6/2016 | Yen et al. |
| 9,386,028 B2 | 7/2016 | Altman |
| 9,531,614 B1 | 12/2016 | Nataraj et al. |
| 9,736,251 B1 | 8/2017 | Samant et al. |
| 9,979,739 B2 | 5/2018 | Mumcuoglu et al. |
| 9,979,742 B2 | 5/2018 | Mumcuoglu et al. |
| 10,027,694 B1 | 7/2018 | Gupta et al. |
| 10,140,453 B1 * | 11/2018 | Fridakis ............... G06F 21/577 |
| 10,237,875 B1 | 3/2019 | Romanov |
| 10,728,281 B2 | 7/2020 | Kurakami |
| 10,904,277 B1 * | 1/2021 | Sharifi Mehr ...... H04L 63/1425 |
| 2002/0133586 A1 | 9/2002 | Shanklin et al. |
| 2003/0110396 A1 | 6/2003 | Lewis et al. |
| 2003/0133443 A1 | 7/2003 | Klinker et al. |
| 2004/0003286 A1 | 1/2004 | Kaler et al. |
| 2004/0015728 A1 | 1/2004 | Cole et al. |
| 2004/0117658 A1 | 6/2004 | Klaes |
| 2004/0199793 A1 | 10/2004 | Wilken et al. |
| 2004/0210769 A1 | 10/2004 | Radatti et al. |
| 2004/0250169 A1 | 12/2004 | Takemori et al. |
| 2004/0260733 A1 | 12/2004 | Adelstein et al. |
| 2005/0060295 A1 | 3/2005 | Gould et al. |
| 2005/0128989 A1 | 6/2005 | Bhagwat et al. |
| 2005/0216749 A1 | 9/2005 | Brent |
| 2005/0262560 A1 | 11/2005 | Gassoway |
| 2005/0268112 A1 | 12/2005 | Wang et al. |
| 2005/0286423 A1 | 12/2005 | Poletto et al. |
| 2006/0018466 A1 | 1/2006 | Adelstein et al. |
| 2006/0075462 A1 | 4/2006 | Golan |
| 2006/0075492 A1 | 4/2006 | Golan et al. |
| 2006/0075500 A1 | 4/2006 | Bertman et al. |
| 2006/0107321 A1 | 5/2006 | Tzadikario |
| 2006/0126522 A1 | 6/2006 | Oh |
| 2006/0136720 A1 | 6/2006 | Armstrong et al. |
| 2006/0137009 A1 | 6/2006 | Chesla |
| 2006/0149848 A1 | 7/2006 | Shay |
| 2006/0161984 A1 | 7/2006 | Phillips et al. |
| 2006/0191010 A1 | 8/2006 | Benjamin |
| 2006/0215627 A1 | 9/2006 | Waxman |
| 2006/0242694 A1 | 10/2006 | Gold et al. |
| 2006/0259967 A1 | 11/2006 | Thomas et al. |
| 2006/0282893 A1 | 12/2006 | Wu et al. |
| 2007/0011319 A1 * | 1/2007 | McClure ................. H04L 41/12 |
| | | 709/224 |
| 2007/0072661 A1 | 3/2007 | Lototski |
| 2007/0198603 A1 | 8/2007 | Tsioutsiouliklis et al. |
| 2007/0218874 A1 | 9/2007 | Sinha et al. |
| 2007/0226796 A1 | 9/2007 | Gilbert et al. |
| 2007/0226802 A1 | 9/2007 | Gopalan et al. |
| 2007/0245420 A1 | 10/2007 | Yong et al. |
| 2007/0255724 A1 | 11/2007 | Jung et al. |
| 2007/0283166 A1 | 12/2007 | Yami et al. |
| 2008/0005782 A1 | 1/2008 | Aziz |
| 2008/0016339 A1 | 1/2008 | Shukla |
| 2008/0016570 A1 | 1/2008 | Capalik |
| 2008/0104046 A1 | 5/2008 | Singla et al. |
| 2008/0104703 A1 | 5/2008 | Rihn et al. |
| 2008/0134296 A1 | 6/2008 | Amitai et al. |
| 2008/0148381 A1 | 6/2008 | Aaron |
| 2008/0198005 A1 | 8/2008 | Schulak et al. |
| 2008/0262991 A1 | 10/2008 | Kapoor et al. |
| 2008/0271143 A1 | 10/2008 | Stephens et al. |
| 2008/0285464 A1 | 11/2008 | Katzir |
| 2009/0007100 A1 | 1/2009 | Field et al. |
| 2009/0007220 A1 | 1/2009 | Ormazabal et al. |
| 2009/0115570 A1 | 5/2009 | Cusack, Jr. |
| 2009/0157574 A1 | 6/2009 | Lee |
| 2009/0164522 A1 | 6/2009 | Fahey |
| 2009/0193103 A1 | 7/2009 | Small et al. |
| 2009/0265777 A1 | 10/2009 | Scott |
| 2009/0320136 A1 | 12/2009 | Lambert et al. |
| 2010/0054241 A1 | 3/2010 | Shah et al. |
| 2010/0071063 A1 | 3/2010 | Wang et al. |
| 2010/0107257 A1 | 4/2010 | Ollmann |
| 2010/0162400 A1 | 6/2010 | Feeney et al. |
| 2010/0197318 A1 | 8/2010 | Petersen et al. |
| 2010/0212013 A1 | 8/2010 | Kim et al. |
| 2010/0217861 A1 | 8/2010 | Wu |
| 2010/0235915 A1 | 9/2010 | Memon et al. |
| 2010/0268818 A1 | 10/2010 | Richmond et al. |
| 2010/0278054 A1 | 11/2010 | Dighe |
| 2010/0280978 A1 | 11/2010 | Shimada et al. |
| 2010/0284282 A1 | 11/2010 | Golic |
| 2010/0299430 A1 | 11/2010 | Powers et al. |
| 2011/0026521 A1 | 2/2011 | Gamage et al. |
| 2011/0035795 A1 | 2/2011 | Shi |
| 2011/0087779 A1 | 4/2011 | Martin et al. |
| 2011/0125770 A1 | 5/2011 | Battestini et al. |
| 2011/0153748 A1 | 6/2011 | Lee et al. |
| 2011/0185055 A1 | 7/2011 | Nappier et al. |
| 2011/0185421 A1 | 7/2011 | Wittenstein et al. |
| 2011/0214187 A1 | 9/2011 | Wittenstein et al. |
| 2011/0247071 A1 | 10/2011 | Hooks et al. |
| 2011/0265011 A1 | 10/2011 | Taylor et al. |
| 2011/0270957 A1 | 11/2011 | Phan et al. |
| 2011/0302653 A1 | 12/2011 | Frantz et al. |
| 2012/0042060 A1 | 2/2012 | Jackowski et al. |
| 2012/0079596 A1 | 3/2012 | Thomas et al. |
| 2012/0102359 A1 | 4/2012 | Hooks |
| 2012/0136802 A1 | 5/2012 | Mcquade et al. |
| 2012/0137342 A1 | 5/2012 | Hartrell et al. |
| 2012/0143650 A1 | 6/2012 | Crowley et al. |
| 2012/0191660 A1 | 7/2012 | Hoog |
| 2012/0222120 A1 | 8/2012 | Rim et al. |
| 2012/0233311 A1 | 9/2012 | Parker et al. |
| 2012/0240185 A1 | 9/2012 | Kapoor et al. |
| 2012/0275505 A1 | 11/2012 | Tzannes et al. |
| 2012/0331553 A1 | 12/2012 | Aziz et al. |
| 2013/0031600 A1 | 1/2013 | Luna et al. |
| 2013/0083700 A1 | 4/2013 | Sndhu et al. |
| 2013/0097706 A1 | 4/2013 | Titonis et al. |
| 2013/0111211 A1 | 5/2013 | Winslow et al. |
| 2013/0031037 A1 | 7/2013 | Brandt et al. |
| 2013/0196549 A1 | 8/2013 | Sorani |
| 2013/0298237 A1 | 11/2013 | Smith |
| 2013/0298243 A1 | 11/2013 | Kumar et al. |
| 2013/0333041 A1 | 12/2013 | Christodorescu et al. |
| 2014/0013434 A1 | 1/2014 | Ranum et al. |
| 2014/0165207 A1 | 6/2014 | Engel et al. |
| 2014/0198669 A1 * | 7/2014 | Brown .................. H04L 43/062 |
| | | 370/250 |
| 2014/0230059 A1 | 8/2014 | Wang |
| 2014/0325643 A1 | 10/2014 | Bart et al. |
| 2015/0040219 A1 | 2/2015 | Garraway et al. |
| 2015/0047032 A1 | 2/2015 | Hannis et al. |
| 2015/0071308 A1 | 3/2015 | Webb, III et al. |
| 2015/0121461 A1 | 4/2015 | Dulkin |
| 2015/0195300 A1 | 7/2015 | Adjaoute |
| 2015/0264069 A1 | 9/2015 | Beauchesne et al. |

(56) References Cited

U.S. PATENT DOCUMENTS

| | | | |
|---|---|---|---|
| 2015/0304346 | A1 | 10/2015 | Kim |
| 2015/0341380 | A1 | 11/2015 | Heo et al. |
| 2015/0341389 | A1 | 11/2015 | Kurakami |
| 2016/0021141 | A1 | 1/2016 | Liu et al. |
| 2016/0127390 | A1 | 5/2016 | Lai et al. |
| 2016/0191918 | A1 | 6/2016 | Lai et al. |
| 2016/0234167 | A1 | 8/2016 | Engel et al. |
| 2016/0315954 | A1 | 10/2016 | Peterson et al. |
| 2016/0323299 | A1 | 11/2016 | Huston, III |
| 2017/0026387 | A1* | 1/2017 | Vissamsetty ........ H04L 63/1466 |
| 2017/0026395 | A1 | 1/2017 | Mumcuoglu et al. |
| 2017/0054744 | A1 | 2/2017 | Mumcuoglu et al. |
| 2017/0063921 | A1 | 3/2017 | Fridman et al. |
| 2017/0078312 | A1 | 3/2017 | Yamada et al. |
| 2017/0111376 | A1 | 4/2017 | Friedlander et al. |
| 2017/0262633 | A1 | 9/2017 | Miserendino et al. |
| 2018/0004948 | A1 | 1/2018 | Martin et al. |
| 2018/0332064 | A1 | 11/2018 | Harris et al. |
| 2019/0044963 | A1 | 2/2019 | Rajasekharan et al. |
| 2019/0334931 | A1 | 10/2019 | Arlitt et al. |
| 2020/0007566 | A1 | 1/2020 | Wu |
| 2020/0145435 | A1 | 5/2020 | Chiu et al. |
| 2020/0195673 | A1 | 6/2020 | Lee |

OTHER PUBLICATIONS

International Application # PCT/IB2019/060538 search report dated Feb. 28, 2020.
Bhuyan et al., "Surveying Port Scans and Their Detection Methodologies", Computer Journal, vol. 54, No. 10, pp. 1565-1581, Apr. 20, 2011.
U.S. Appl. No. 15/950,234 office action dated Mar. 24, 2020.
Barford et al., "Characteristics of Network Traffic Flow Anomalies," Proceedings of the 1st ACM SIGCOMM Workshop on Internet Measurement, pp. 69-73, San Francisco, USA, Nov. 1-2, 2001.
Niksun, "Network Intrusion Forensic System (NIFS) for Intrusion Detection and Advanced Post Incident Forensics", Whitepaper, 12 pages, Feb. 15, 2010.
Shulman, A., "Top Ten Database Security Threats How to Mitigate the Most Significant Database Vulnerabilities", White Paper, 14 pages, year 2006.
Skormin, "Anomaly-Based Intrusion Detection Systems Utilizing System Call Data", Watson School of Engineering at Binghamton University, pp. 1-82, Mar. 1, 2012.
U.S. Appl. No. 15/950,234 Office Action dated Aug. 7, 2020.
Asrigo et al., "Using VMM-based sensors to monitor honeypots," Proceedings of the 2nd International Conference on Virtual Execution Environments, pp. 13-23, Jun. 14, 2006.
Bilge et at., "Disclosure: Detecting Botnet Command and Control Servers Through Large-Scale NetFlow Analysis", ACSAC, 10 Pages, Dec. 3-7, 2012.
Blum., "Combining Labeled and Unlabeled Data with Co-Training", Carnegie Mellon University, Research Showcase @ CMU, Computer Science Department, 11 pages, Jul. 1998.
Felegyhazi et al., "On the Potential of Proactive Domain Blacklisting", LEET'10 Proceedings of the 3rd USENIX Conference on Large-scale exploits and emergent threats, 8 pages, San Jose, USA, Apr. 27, 2010.
Frosch., "Mining DNS-related Data for Suspicious Features", Ruhr Universitat Bochum, Master'sThesis, 88 pages, Dec. 23, 2011.
Bilgeat al., "Exposure: Finding Malicious Domains Using Passive DNS Analysis ", NDSS Symposium, 17 pages, Feb. 6-9, 2011.
Gross et al., "FIRE: Finding Rogue nEtworks", Annual Conference on Computer Security Applications (ACSAC'09), 10 pages, Dec. 7-11, 2009.
Markowitz, N., "Bullet Proof Hosting: A Theoretical Model", Security Week, 5 pages, Jun. 29, 2010, downloaded from http://www.infosecisland.com/blogview/4487-Bullet-Proof-Hosting-A-Theoretical-Model.html.
Konte et al., "ASwatch: An AS Reputation System to Expose Bulletproof Hosting ASes", SIGCOMM , pp. 625-638, Aug. 17-21, 2015.
Markowitz, N., "Patterns of Use and Abuse with IP Addresses", Security Week, 4 pages, Jul. 10, 2010, downloaded from http://infosecisland.com/blogview/5068-Patterns-of-Use-and-Abuse-with-IP-Addresses.html.
Wei et al., "Identifying New Spam Domains by Hosting IPs: Improving Domain Blacklisting", Department of Computer and Information Sciences, University of Alabama at Birmingham, USA, 8 pages, Dec. 8, 2010.
Goncharov,M., "Criminal Hideouts for Lease: Bulletproof Hosting Services", Forward-Looking Threat Research (FTR) Team, A TrendLabsSM Research Paper, 28 pages, Jul. 3, 2015.
Light Cyber LTD, "LightCyber Magna", 3 pages, year 2011.
TIER-3 PTY LTD, "Huntsman Protector 360", Brochure, 2 pages, Apr. 1, 2010.
TIER-3 PTY LTD, "Huntsman 5.7 The Power of 2", Brochure, 2 pages, Oct. 8, 2012.
Meshi et al., U.S. Appl. No. 15/950,234, filed Apr. 11, 2018.
Meshi et al., U.S. Appl. No. 16/261,606, filed Jan. 30, 2019.
Meshi et al., U.S. Appl. No. 16/261,608, filed Jan. 30, 2019.
Amit et al., U.S. Appl. No. 16/261,642, filed Jan. 30, 2019.
Meshi et al., U.S. Appl. No. 16/261,655, filed Jan. 30, 2019.
U.S. Appl. No. 16/261,606 Office Action dated Feb. 5, 2021.
U.S. Appl. No. 16/261,608 Office Action dated Feb. 5, 2021.
U.S. Appl. No. 16/261,655 Office Action dated Jan. 29, 2021.

\* cited by examiner

MALICIOUS PORT SCAN DETECTION USING PORT PROFILES

FIELD OF THE INVENTION

The present invention relates generally to computer security, and particularly to detecting port scan attacks.

BACKGROUND OF THE INVENTION

In computer networking, a communication port is a logical communication endpoint on the network that, from a software standpoint, identifies a specific resource (e.g., a process or a type of service) executing on a given computer in the network. Communication ports (also referred to herein simply as ports or port numbers) are typically defined by a communications protocol. For example, ports are one of the Layer 4 (i.e., the Transport Layer) protocols in the Open Systems Interconnection (OSI) model, and are used to define network sessions in client-server application architectures.

Ports provide a multiplexing service for multiple services or multiple communication sessions at one network address. In operation, ports are part of the addressing information used to identify sources and destinations of messages transmitted over a network. Additionally, each "open" port is typically associated with a specific service such as have a service that is connected to them such as a database service, an email service or a communication service.

Network port scanning is a method for determining which ports on a network are open. Running a port scan on a network or server reveals which ports are open and configured to receive and/or send information. Network professionals can use port scanning tools to measure their exposure to attackers and to monitor devices and services. Hackers, on the other hand, scan ports to probe networks for open ports that may be exploitable and to map which services run on each device. For example, a hacker can send a message to multiple ports, and analyze the responses from each given port in order to determine if the port is being used, and if so, what service is using the given port.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method including defining, for a given software category, respective, disjoint sets of communication ports that are used by each of a plurality of software systems in the given software category, including at least first and second disjoint sets, identifying, in data traffic transmitted between multiple nodes that communicate over a network, a set of port scans, each of the port scans including an access, in the data traffic, of a plurality of the communication ports on a given destination node by a given source node during a predefined time period, and upon detecting a port scan by one of the nodes including accesses of at least one of the communication ports in the first set and at least one of the communication ports in the second set, initiating a preventive action.

In one embodiment, identifying the port scans includes identifying, in the data traffic, a set of pairs of the source and the destination nodes, each pair consisting of a given source node and a given destination node, and one or more of the communication ports accessed in the data traffic between the source and destination nodes in each pair, computing, for each pair in the set, a respective baseline level that is indicative of a first number of the communication ports that source nodes other than the given source node in the pair accessed on the given destination node during a first time period, computing, for each pair in the set, a respective test score that is indicative of a difference between a second number of the communication ports that the given source node in the pair accessed on the given destination node during a second time period and the baseline level, and designating any of the pairs for which the test score is greater than a specified level as the port scans.

In some embodiments, detecting accesses of at least one of the communication ports in the first set includes detecting accesses of at least a specified number of the communication ports in the first set, wherein the specified number is greater than one. In additional embodiments, the at least one of the communication ports in the first set and at least one of the communication ports in the second set include at least a specified number of the communication ports in each of the first and the second sets, wherein the specified number is greater than one.

In a first embodiment, the given software category includes operating systems. In a second embodiment, the given software category includes database servers. In a third embodiment, the given software category includes email servers. In a fourth embodiment, the given software category includes remote session applications.

In further embodiments, initiating the preventive action include generating an alert for the given source node in the detected port scan. In supplemental embodiments, initiating the preventive action includes restricting access of the given source node in the detected port scan to the network.

There is also provided, in accordance with an embodiment of the present invention, an apparatus including a network interface device coupled to a data network including multiple nodes that communicate via the network, and at least one processor configured to define, for a given software category, respective, disjoint sets of communication ports that are used by each of a plurality of software systems in the given software category, including at least first and second disjoint sets, to identify, in data traffic transmitted between multiple nodes that communicate over a network, a set of port scans, each of the port scans including an access, in the data traffic, of a plurality of the communication ports on a given destination node by a given source node during a predefined time period, and upon detecting a port scan by one of the nodes including accesses of at least one of the communication ports in the first set and at least one of the communication ports in the second set, to initiate a preventive action.

There is additionally provided, in accordance with an embodiment of the present invention, a computer software product, the product including a non-transitory computer-readable medium, in which program instructions are stored, which instructions, when read by a computer, cause the computer to define, for a given software category, respective, disjoint sets of communication ports that are used by each of a plurality of software systems in the given software category, including at least first and second disjoint sets, to identify, in data traffic transmitted between multiple nodes that communicate over a network, a set of port scans, each of the port scans including an access, in the data traffic, of a plurality of the communication ports on a given destination node by a given source node during a predefined time period, and upon detecting a port scan by one of the nodes including accesses of at least one of the communication ports in the first set and at least one of the communication ports in the second set, to initiate a preventive action.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Embodiments of the present invention provide methods and systems for identifying port scans on a data network. As described hereinbelow, while monitoring data traffic transmitted between multiple nodes that communicate over a network, a set of pairs of source and destination nodes are identified, each pair consisting of a given source node and a given destination node, and one or more communication ports accessed in the data traffic between the source and destination nodes in each pair. For each pair in the set, a respective baseline level and a respective test score are computed. For each pair in the set, the respective baseline level is indicative of a first number of the communication ports that source nodes other than the given source node in the pair accessed on the given destination node a first time period, and the respective test score that is indicative of a difference between a second number of the communication ports that the given source node in the pair accessed on the given destination node during a second time period and the baseline level. A preventive action can be initiated with respect to the given source node in any of the pairs for which the test score is greater than a specified level.

Embodiments of the present invention also provide methods and systems for detecting if any of the identified port scans comprise an anomalous combination of ports that can indicate a malicious port scan. Examples of anomalous combination of ports include, but are not limited to, port pairs and port groups. As described hereinbelow, the analysis to detect the suspicious port scans may be based on source profiles, port profiles, port pair profiles and scanner probe profiles.

System Description

Figure 1:
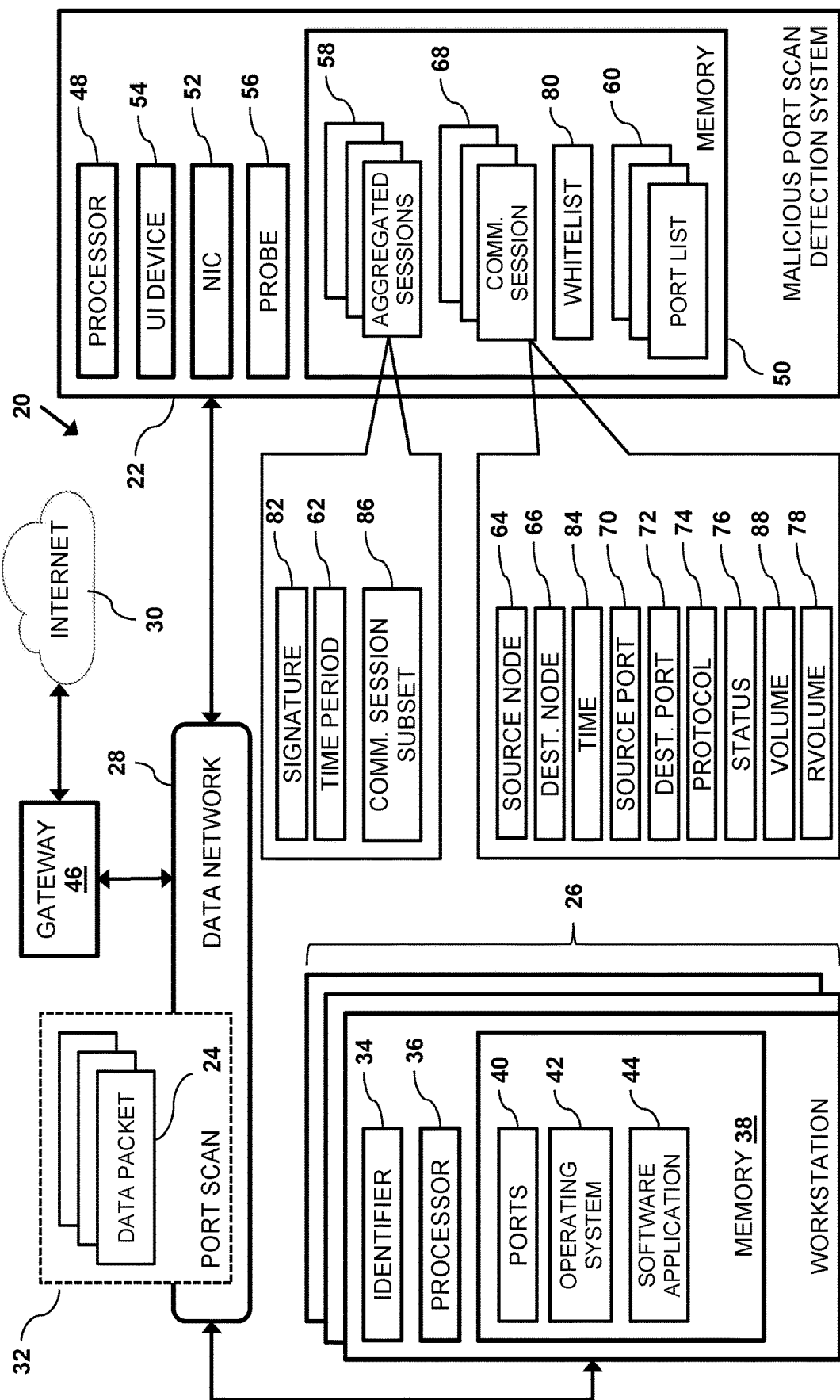
FIG. 1 is a block diagram that schematically shows a computing facility comprising a system configured to detect port scans suspected of being malicious, in accordance with an embodiment of the present invention.

FIG. 1 is a block diagram that schematically shows a computing facility 20 comprising a malicious port scan detection system 22 that collects and monitors data packets 24 transmitted between multiple nodes 26 coupled to a data network 28 in order to identify malicious port scans, in accordance with an embodiment of the present invention. In embodiments described herein, each node 26 comprises any type of device (i.e., physical or virtual) that is configured to communicate over the network, and has an IP address assigned for this purpose. In the example shown in FIG. 1, the nodes comprise workstations 26 and a public network 30 such as the Internet. As described hereinbelow, embodiments of the present invention aggregate the data packets into communication sessions, identify any of the communication sessions that comprise port scans 32, and generate an alert for any of the port scans that are suspected of being malicious.

While the example shown in FIG. 1 shows the nodes comprising workstations 26, nodes 26 comprising other types of devices that communicate over network 28 and Internet 30 are considered to be within the spirit and scope of the present invention. For example, the nodes may comprise devices such as servers, wireless devices such as smartphones, routers and network switches.

Each workstation 26 may comprise, for example, a workstation identifier (ID) 34, a workstation processor 36, a workstation memory 38 that stores a plurality of communication ports 40 (also referred to herein simply as ports). Unlike physical ports, ports 40 are logical entities that are defined by a communications protocol such as TCP/IP.

Examples of workstation IDs 34 include, but are not limited to, a media access control (MAC) addresses and Internet Protocol (IP) addresses that can be used to uniquely identify each of the workstations. While any given time, each given workstation 26 is assigned a unique IP address, the given workstation may be associated with multiple IP addresses over an extended time period. For example, the IP address for a given workstation 26 may change after a reboot of the given workstation. Generally, in operation, processor 36 executes, from memory 38, an operating system 42 (e.g., Linux) and one or more software applications 44 (e.g., a database server).

In the configuration shown in FIG. 1, memory 38 also stores a whitelist 80 that stores the identifiers for one or more workstations 26. As described in the description referencing FIGS. 4 and 7 hereinbelow, embodiments of the present invention can ignore any suspicious port scan 32 that is initiated by any workstation 26 in the whitelist.

Workstations 26 communicate over data network 28 (e.g., a local area network) that is also coupled to an Internet gateway 46. Gateway 46 couples computing facility 20 to public networks 30 such as the Internet, and comprises communications circuitry (not shown) that enables communication between workstations 26 and sites/computers (not shown) on the Internet.

In some embodiments, malicious port scan detection system 22 comprises a system processor 48 and a system memory 50, which are coupled by a system bus (not shown) to a network interface controller (NIC) 52 that couples the computer system to network 28. In some embodiments, malicious port scan detection system 22 may comprise a user interface (UI) device 54 (e.g., an LED display) or another type of output interface.

In the configuration shown in FIG. 1, malicious port scan detection system 22 comprises a probe 56 that collects information on data packets 24 transmitted over network 28. While the example in FIG. 1 shows probe 56 as a module of malicious port scan detection system 22, the probe can be implemented either as a standalone device coupled to network 28, or as a module in another device coupled to the network. Probe optionally collects data packets 24 from network 28 and processes the collected data packets to extract information, using any of the methods described, in U.S. Patent Application 2014/0165207 to Engel et al. and U.S. Patent Application 2015/0358344 to Mumcuoglu et al., whose disclosures are incorporated herein by reference.

Memory 50 stores respective pluralities of communication sessions 68, aggregated communication sessions 58 and port lists 60. In embodiments described herein, processor 48 is configured to collect the data packets from probe 56, to group the data packets into communication sessions 68, to aggregate the communication sessions into aggregated communication sessions 58, and to identify any of the aggregated communication sessions that indicate a given port scan 32. The use of port lists 60, which store respective pluralities of ports 40 (i.e., port numbers), is described in the description referencing FIG. 5, hereinbelow.

In the configuration shown in FIG. 1, memory 50 also stores a whitelist 80 that stores the identifiers for one or more workstations 26. As described in the description referencing FIGS. 4 and 7 hereinbelow, embodiments of the present invention can ignore any suspicious port scan 32 that is initiated by any workstation 26 in the whitelist.

Each communication session 68 optionally comprises a source node identifier 64, a destination port identifier 66, a time 84, a source port identifier 70, a destination port identifier 72, a protocol 74, a status 76, a volume 88 (source to destination), a reverse-volume 78 (also referred to as rvolume, destination to source), and a time 84. Each aggregated communication session 58 optionally comprises a port scan time period 62, a subset 86 of the communication sessions, and a signature 82.

In each given communication session 68, source node 64 stores the identifier of a first given workstation 26, destination node 66 stores the identifier of a second given workstation 26, source port 70 refers to a given port 40 on the first given workstation that is being used to communicate with the second given workstation during the given communication session, the destination port 72 refers to a given port 40 on the second given workstation that is being accessed during the given communication session, the protocol 74 refers to a given communications protocol (e.g., NFS, SSH, KERBEROS, LDAP) that is used by the given communication session, the status 76 indicates whether the given communication session completed successfully, volume 88 indicates an amount of data transmitted from the first given workstation to the second given workstation during the given communication session, and reverse volume 78 indicates an amount of data transmitted from the second given workstation to the first given workstation during the given communication session.

In embodiments described herein, source node 64 may be used to refer to the first given workstation, and destination node 66 may be used to refer to the second given workstation. In embodiments where workstations communicate using TCP/IP, processor can identify the source and the destination ports for a given communication session 68 based on information stored in a given data packet 24 storing the TCP header.

For each aggregated communication session 58, the port scan time period 62 comprise specified time period (e.g., a specific number of hours or days), and subset 86 refers to a plurality of communication sessions 68. Signatures 82 are described in the description referencing FIG. 7, hereinbelow.

In some embodiments, the tasks of collecting the data packets, grouping the data packets into the communication sessions, aggregating the communication sessions and identifying the aggregated communication sessions that comprise port scans 32 may be split among multiple devices within computing facility (e.g., workstations 26) or external to the computing facility (e.g., a data cloud based application). In some embodiments, the functionality of some or all of workstations 26 and/or malicious port scan detection system 22 may be deployed in computing facility 20 as virtual machines.

Examples of memories 38 and 50 include dynamic random-access memories and non-volatile random-access memories. In some embodiments, the memories may comprise non-volatile storage devices such as hard disk drives and solid-state disk drives.

Processors 36 and 48 comprise general-purpose central processing units (CPU) or special-purpose embedded processors, which are programmed in software or firmware to carry out the functions described herein. This software may be downloaded to computers 22 and 26 in electronic form, over a network, for example. Additionally or alternatively, the software may be stored on tangible, non-transitory computer-readable media, such as optical, magnetic, or electronic memory media. Further additionally or alternatively, at least some of the functions of processors 36 and 48 may be carried out by hard-wired or programmable digital logic circuits.

Port Scan Collection

Figure 2:
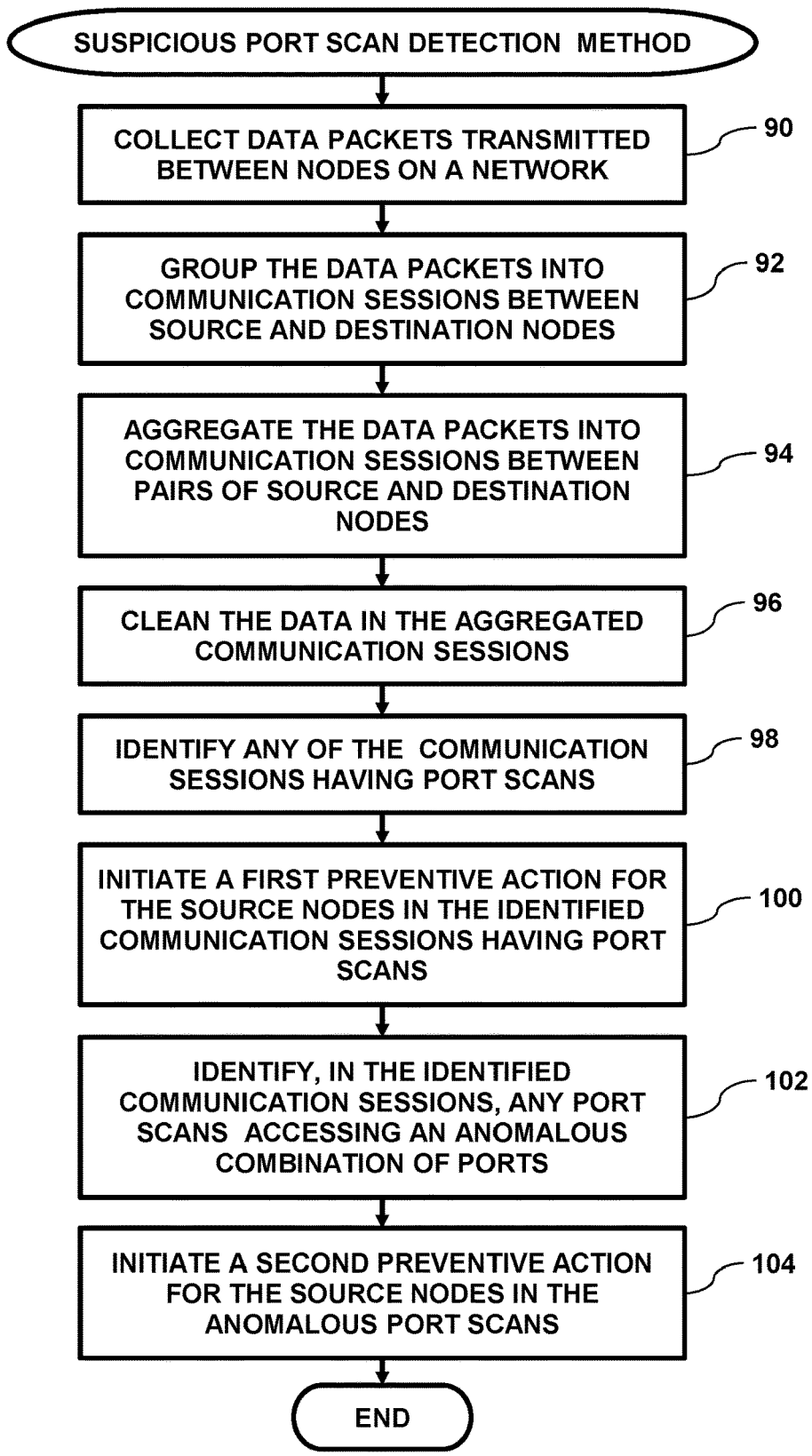
FIG. 2 is a flow diagram that schematically illustrates a method of identifying, in data packets transmitted from source nodes to destination nodes over the network, suspicious port scans, in accordance with an embodiment of the present invention.

FIG. 2 is a flow diagram that schematically illustrates a method for identifying suspicious port scans 32 on network 28, in accordance with an embodiment of the present invention. In embodiments described herein, a suspicious port scan comprises a source workstation 26 that accesses an anomalous combination of communication ports 40 on a destination workstation 26 within a predetermined time period.

In step 90, processor 48 uses probe 56 to collect data packets 24 that are transmitted between nodes 26 on network 28 during a time period that comprises multiple sub-periods. For example, the time period may comprise seven consecutive days (i.e., one week), and each sub-period may comprise any 24 hour period (e.g., one day) during the week.

In step 92, processor 48 groups and stores the collected data packets as individual communication sessions 68 between respective pairs of source and destination nodes 26. The communication session typically comprises a sequence of data packets 24 that a first given workstation 26 transmits to a given port 40 on a second given workstation 26. Upon detecting a given sequence of data packets, processor 48 defines a new communication session 68, and stores, to the new communication session, the identifier for the first given workstation to source node 64, the identifier for the second given workstation to destination node 66, the date and time that the given sequence of data packets were collected to time 84, the port number for the first given workstation in the TCP header to source port 70, the port for the second given workstation in the TCP header to destination port 72, a communications protocol used by the sequence of data packets to protocol 74, a status (e.g., succeeded/failed) of the communication session to status 76, and a first amount of data (e.g., 600 bytes) that the first given workstation transmitted to the second given workstation in the sequence of data packets to volume 88.

In some instances, the sequence of data packets may also comprise a second volume of data (e.g., 200 bytes) that the second given workstation transmits to the first given workstation. Process 48 can store the second amount of data to rvolume 78.

In some embodiments, processor 48 can group the packets according to the IP addresses (not shown) in the packets, such that the system processor can group together packets 24 having the same source and destination addresses or having the same source address, source port, destination address, destination port and protocol. In an alternative embodiment, processor 48 can manage a table (not shown) which correlates between addresses in packets and respective IDs 34 of nodes 26, for example as described in U.S. Patent Application 2016/0234167, which is incorporated herein by reference, and groups together packets according to the IDs corresponding to the addresses in the packets. An example for grouping the collected data packets is described in U.S. patent application Ser. No. 15/950,234, filed Apr. 11, 2018, which is incorporated herein by reference.

In step 94, processor 48 aggregates the communication sessions into a plurality of aggregated communication sessions 58, so that each of the aggregated communication sessions comprises the data in the communication sessions for each unique pair of source and destination nodes that communicated with each other during a given sub-period. In embodiments of the present invention, each sub-period typically comprises a predefined time period (e.g., one hour, two hours or 24 hours).

When aggregating communication sessions 68, processor 48 can identify and flag any of the communication sessions to a given port 40 that failed. In embodiments herein, these flagged communication sessions may be referred to as failed connections. A communication session to a given port 40 can be flagged as a failed connection if no response is received from the given port, or if a response is received indicating that the given port is closed. A failed connection is typically a result of a faulty configuration of a given node 26, and a given port 40 can be identified as a failed port by detecting that there are no successful connections to the given port on the given node. For example, if given node 26 comprises an email server that is configured with a wrong IP address, other nodes 26 on the network will generate failed connections when they attempt to access a wrong destination port on the email server.

In the TCP/IP communications model, a successful communication session comprises (a) a given source node 64 transmitting a "SYN" command to a given destination node 66, (b) the given destination node transmitting a "SYN-ACK" command to the given source node in response to receiving the "SYN" command, and (c) the given source node transmits an "ACK" command to the given destination node in response to receiving the "SYN-ACK" command. In embodiments of the present invention, processor 48 can identify a failed connection by detecting a given communication session 68 that is missing a "SYN-ACK" command transmitted from a given destination node 66 to a given source node 64 and/or is missing an "ACK" command transmitted from the given source node to the given destination node.

In embodiments of the present invention, processor 48 can use failed connection information to determine if any of the aggregated communication sessions comprise any port scans. For example, if all the communication sessions in a given aggregated communication session 58 are successful (i.e., have successful transmissions of the "SYN", "SYN-ACK" and "ACK" commands), them there is a low likelihood that the given aggregated communication session comprises a port scan. However, if all the connections in the given aggregated communication session comprise failed connections on different ports 40 (as detected using embodiments described supra), then there is a high likelihood that the given aggregated communication session comprises a port scan.

In step 96, processor 48 "cleans" the data in port scan records in order to retain the data that is relevant for analysis. In one embodiment, processor 48 can clean the data by filtering out any of the communication sessions comprising port scans having source ports 70 and protocols 74 that are known to have activity in numerous destination ports 72. For example, based on parameters provided by a systems administrator, processor 48 can filter out any of the port scans whose protocol is NFS and whose source port numbers are either "829", "2049" or "20048". In a another embodiment, a given port list 60 may comprise a set of ports 40 that are used by services available on network 28, and processor 48 can filter out any scans of ports 40 in the given port list.

In step 98, processor 48 identifies one or more aggregated port communication sessions 58 that comprise respective port scans 32. In some embodiments, processor 48 can use destination profiles to identify a given port scan, as described in the description referencing FIG. 3 hereinbelow.

In step 100, in response to identifying the port scans in step 88, processor 48 can initiate, for the source node in each identified port scan 32, a first preventive action. In one embodiment, processor 48 can initiate the first preventive action by presenting, on user interface device 54, an alert message indicating that the identified source node is performing suspicious port scans. In another embodiment, processor 48 can initiate the first preventive action by restricting the identified source node from accessing network 28 (e.g., by conveying an instruction to a network switch or a firewall coupling the identified source node to network 28).

In an additional embodiment, processor 48 can initiate the first preventive action by transmitting the identifier of the given source node to an alert management system (not shown) such as a security information and event management (SIEM) system. In a further embodiment, processor 8 can generate the alert by storing the identifier of the given source node to a data structure (not shown) that an alert management system (e.g., a SIEM system) can extract via an API (not shown).

In one variation of the embodiments described hereinabove, processor 48 can identify a user (e.g., via login credentials) of the source node in an identified port scan, and initiate the preventive action with respect to the given user. In another variation of the embodiments described hereinabove, processor 48 can identify, on the source node in an identified port scan, a software process that accessed the ports in the identified port scan, and initiate the preventive action with respect to the software process.

In step 102, processor 48 identifies a given identified port scan that comprises a given source node 64 that scanned an anomalous combination of destination ports 72 on a given destination node 66 during the time period (i.e., a test period). Different embodiments for detecting the anomalous combinations are described hereinbelow in the respective descriptions referencing FIGS. 4-7. The port scan identified in step 90 may also be referred to herein as a suspicious port scan.

Finally in step 104, in response to identifying the anomalous port scans in step 102, processor 48 can initiate a second preventive action for the source nodes in the anomalous port scans, and the method ends. Examples of preventative actions are described supra.

Destination Profiles

In embodiments of the present invention, processor 48 can use destination profiles to detect port scans 32. As described hereinbelow, processor 48 can generate, based on data packets 24 collected during a specified time period, destination profiles for each given destination node 66 that indicates a typical number of ports 40 (i.e., destination ports 72) scanned on the given destination node, and use the destination profiles to detect any subsequently collected port scans that are anomalous.

Figure 3:
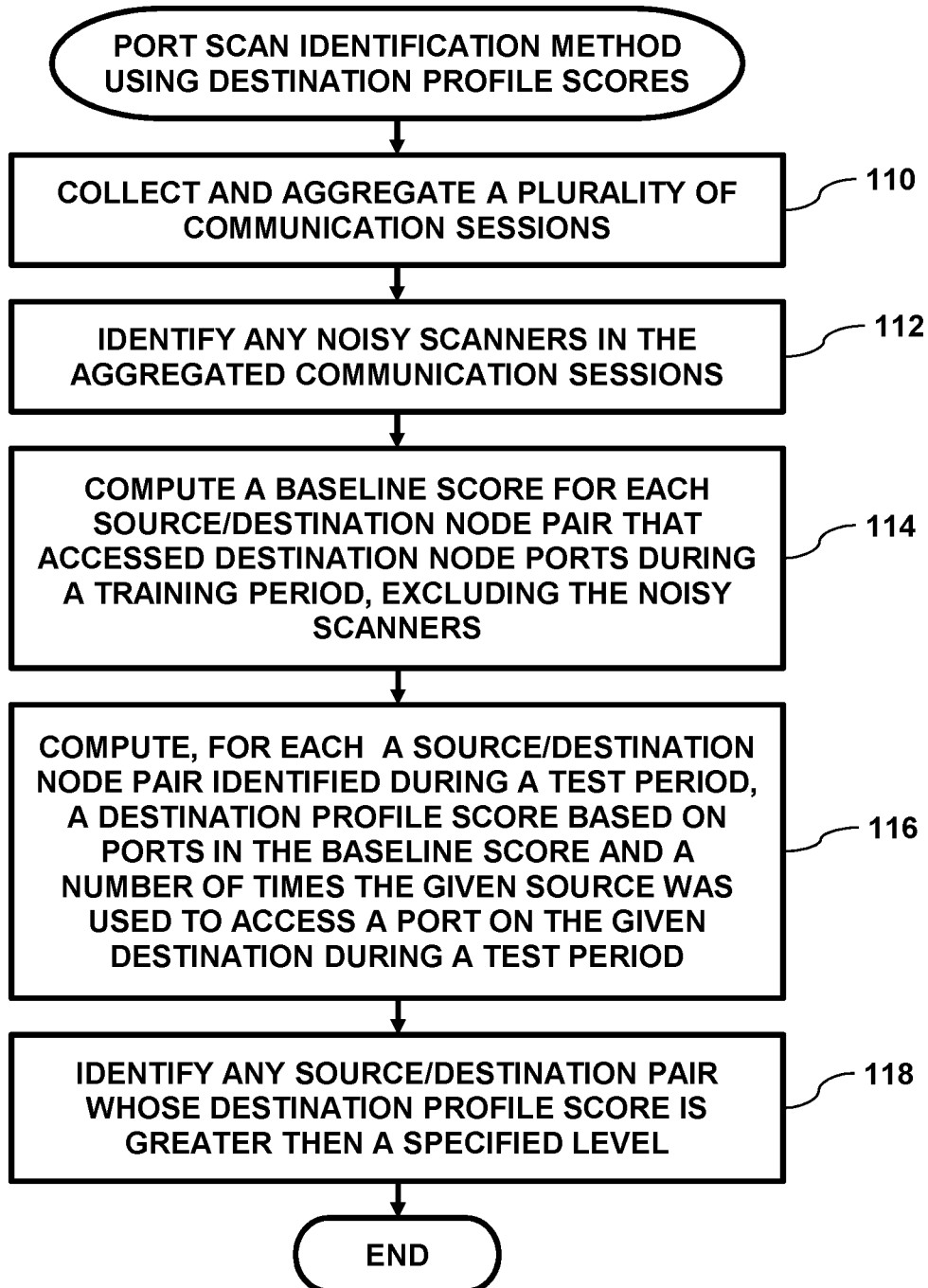
FIG. 3 is a flow diagram that schematically illustrates a method of generating a destination a profile score that can be used to detect port scans, in accordance with an embodiment of the present invention.

FIG. 3 is a flow diagram that schematically illustrates a method for computing destination profile scores, and using the computed scores to identify port scans 32, in accordance with an embodiment of the present invention. In step 110, using embodiments described in the description referencing FIG. 2 hereinabove, processor 48 identifies a set of port scans. To identify the set of port scans, processor 48 collects communication sessions 68 and aggregates them into aggregated communication sessions 58. Each aggregated communication session 58 comprises a given port scan 32 having a first given workstation 26 accessing at least one given communication port 40 on a second given destination 26.

Processor 48 collects the communication sessions during multiple time periods that include a training period (also referred to herein as a first time period) and a test period (also referred to herein as a second time period). The test and training periods may have substantially identical (e.g., within 10%) time durations. For example, the test and training periods may comprise 24 hour periods. In some embodiments, the test period is subsequent to the training period. In additional embodiments, the training and the test periods may overlap partially of completely (i.e., the same time period).

In step 112, processor 48 identifies any of the source nodes in the aggregated communication sessions that are "noisy scanners". In embodiments of the present invention, a given source node 64 can be classified as a noisy scanner if the given source node accesses (i.e., "scans") at least a first number (e.g., at least 20, at least 25, at least 30, at least 35, or at least 40) of destination ports 72 on at least a second number (e.g., 80, 90, 100, or 110) of destination nodes 66 during the training period. In some embodiments, the second number is greater than the first number. As described hereinbelow, processor 48 can ignore any source node 64 that the system processor classified as a noisy scanner.

In step 114, processor 48 computes, for each pair of a given source node 64 and a given destination node 66 in the aggregated communication sessions, a baseline score (also referred to herein as a baseline level) that indicates a typical number of ports 40 that remaining first source nodes (i.e., excluding the given source node and in some embodiments, any of the source nodes that identified as noisy scanners) accessed on the given destination node during a given sub-period (e.g., one day) in the training period. In some embodiments, processor 48 can use the following formula for each of the source node 66 and destination node 66 pairs (i,j) to compute baseline scores:

$$Baseline_{i,j} = \frac{1}{D} * \sum_{d \in baseline\_days} \frac{1}{|L_j^d(i)|} \sum_{k \in L_j^d(i)} (P_{k,j}^d) \quad (1)$$

where
$L_j^d(i)$—set of the source nodes of the destination node j in day d (i.e., a given sub-period) excluding {i,noisy_scanners}.
$P_{k,j}^d$—a number of distinct destination ports 72 between the source node k and the destination node j on day d.
D—a number of baseline days d in the training period.

In operation, processor 48 can compute Equation (1) for a single training period D or for a training period having multiple sub-periods D. In embodiments with a single period D, the training and the test periods may have substantially identical time durations, and in embodiments with multiple periods D, the sub-periods and the test periods may have substantially identical time durations.

In step 116, processor 48 computes, for each pair of a given source node 64 and a given destination node 66 in the second aggregated communication sessions, a destination profile score that can be used to identify, based on the destination ports on the destination nodes accessed by the source nodes during the training and the test periods, any of the source nodes that are suspected of performing port scans 32. For example, processor 48 can compute, for each pair (i,j) identified during the test period, the following destination profile score:

$$Score_{i,j} = P_{i,j}^* - Baseline_{i,j} \quad (2)$$

where $P_{i,j}^*$ comprises a number of destination ports 72 that the source node i accessed on the destination node j during the test period. In embodiments of the present invention, a higher destination profile score for a given pair (i,j) indicates that number of ports 40 that a given source node i scanned on a given destination node j during the test period was greater than the ports on the given destination node that the given source node scanned during the training period. A higher $Score_{i,j}$ indicates a higher probability that the source node i is performing a port scan on the destination node j.

Finally, in step 118, processor 48 can identify a given pair of source and destination nodes whose destination profile score exceeds a specified threshold (i.e., a level), thereby indicating suspicious port scans, and the method ends. In one embodiment the threshold may comprise a large score value (e.g., 7, 8, 9 or 10) for the score. In another embodiment the threshold may comprise a low score value (e.g., 4, 5 or 6) and the number of failed connections between the source and destination nodes during the test period is greater than a low failed connection value (e.g., 0, 1 or 2).

Source Profile Generation

In a second anomalous port scan detection embodiment, processor 48 can use source profiles to detect potentially malicious port scans. As described hereinbelow, processor 48 can generate, based on ports scans 24 collected during a specified time period, a source profile for each given source node 64 that indicates nodes whether or not a given source node is either an aggressive scanner or a periodic scanner. In embodiments of the present invention, scans from aggressive and periodic scanners are not considered to be suspicious, and the aggressive and periodic scanners can be whitelisted.

Computer networks such as network 28 typically comprise workstations 28 that can execute processes that perform legitimate port scans or perform legitimate activities that resemble ports scans (i.e. with a different intention). Since these services or activities sometimes originate from the same source node 64, embodiments of the present invention can generate and use source profiles to detect these source nodes in order to whitelist their legitimate port scanning activity.

Figure 4:
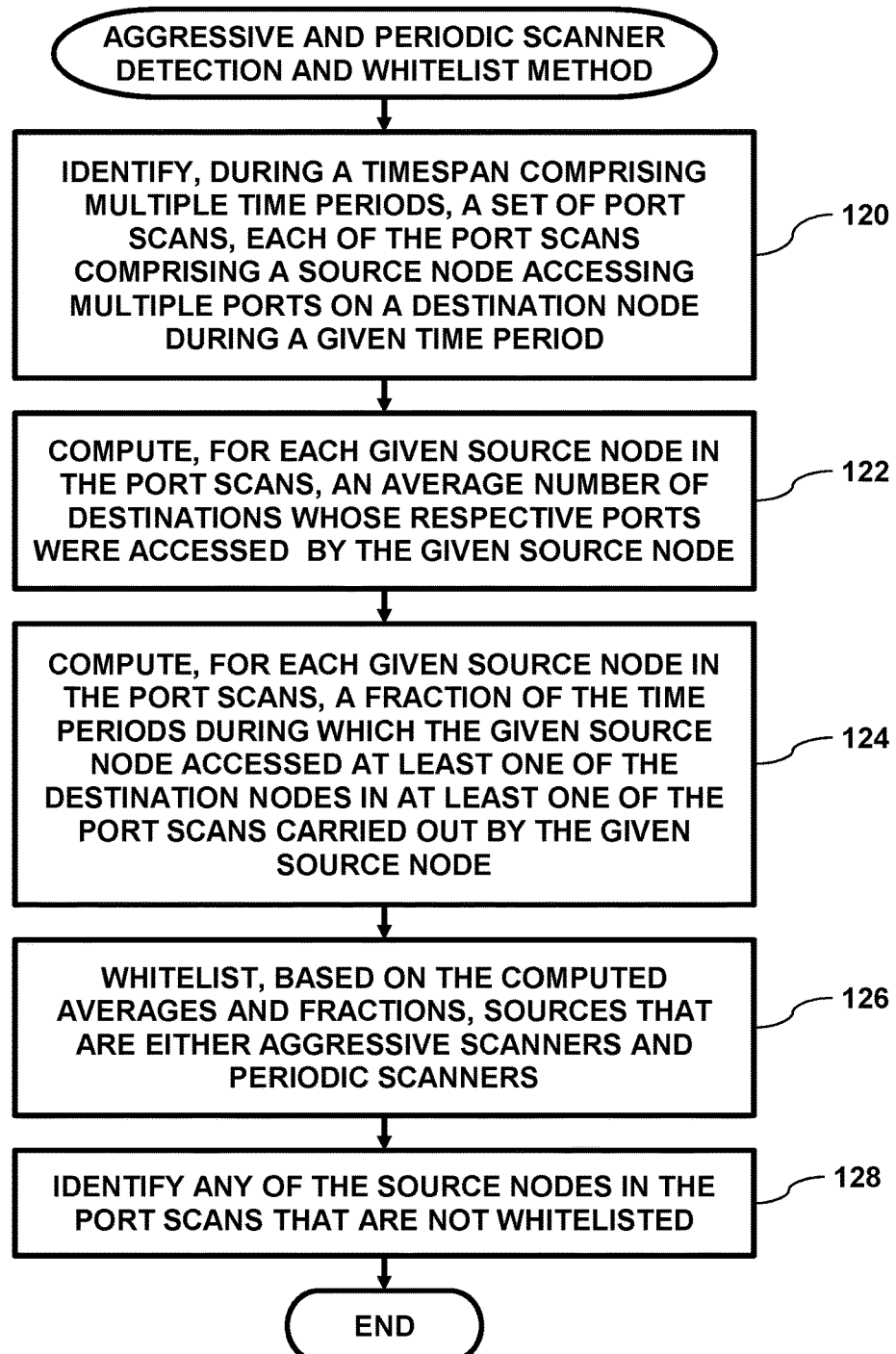
FIG. 4 is a flow diagram that schematically illustrates a method of generating a source profile that can be used to detect and whitelist aggressive and periodic scanners, in accordance with an embodiment of the present invention.

FIG. 4 is a flow diagram that schematically illustrates a method for computing source profiles, and using the computed source profiles to detect and whitelist any source nodes 64 that are aggressive or periodic scanners, in accordance with an embodiment of the present invention. In step 120, using embodiments described in the description referencing FIG. 2 hereinabove, processor 48 identifies a set of port scans. To identify the set of port scans, processor 48 collects, during a timespan comprising multiple predefined time periods, communication sessions 68 and aggregates them into aggregated communication sessions 58. Each aggregated communication session 58 comprises a given port scan 32 having a first given workstation 26 accessing at least one given communication port 40 on a second given destination 26 during a given time period. The predefined time periods may have substantially identical time durations (e.g., one day).

In step 122, processor 48 computes, for each given source node "i" in the port scans, scanned_dests_average$_i$ that indicates an average number of destination nodes 66 whose respective communication ports 40 were accessed by the given source node during any given scan by the given source node. In some embodiments, scanned_dests_average$_i$ comprises an average number of the destination nodes that the given source node scanned per time period, omitting time periods where no scans were performed by the given source node.

In step 124, processor 48 computes for each given source node "i" in the port scans, for the given source node i, $$\text{scan\_ratio}_i = \frac{\text{scan\_days}}{D},$$

which indicates a fraction of the time periods D during which the given source node accessed at least one of the destination nodes in at least one of the port scans carried out by the given source node.

In step 126, processor 48 whitelists, based on the computed scanned_dests_average$_i$ averages and scan_ratio$_i$ fractions, any of the source nodes that are classified either as aggressive or periodic scanners, as described in the criteria hereinbelow, To whitelist a given source node 64, processor 48 adds the given source node (i.e., the corresponding port number) to whitelist 80.

In embodiments of the present invention, an aggressive scanner can be defined as a given source node 64 that scans a few destination nodes 66 during every time period (e.g., every day). For example, an aggressive scanner might scan a database server and a web server (i.e., two different destination nodes) every hour to check on their respective statuses. In some embodiments, for each given source node 64, processor 48 can first identify scan_days$_i$ as a number of days the given source node performed at least one scan, and can classify the given source node as an aggressive scanner if ∀i:scanned_dests_average$_i$ exceeds a first low threshold (e.g., 2, 3, 4, 5, 6, 7) and/or scan_ratio$_i$ exceeds a first high threshold (e.g., 0.5, 0.6, 0.7, 0.8).

For example, if the first low threshold is 3, the first high threshold is 0.5, and the daily number of destination nodes 66 scanned by a given source node 64 is [3,0,4,4,6,3], then the given source node is an aggressive scanner since scan_days$_i$=5, scanned_dests_average$_i$=4, and scan_ratio$_i$=0.833.

In embodiments of the present invention, a periodic scanner can be defined as a given source node 64 that scans many destinations with less frequency (e.g., once a week). For example, a periodic scanner may scan ports 40 on all the nodes (e.g., workstations 26) on network 28 on a weekly basis to see if there are any changes such as if any new ports 40 are open or if there are any respective vulnerabilities in the nodes. In a manner similar to detecting aggressive scanners, for each given source node 64, processor 48 can first identify scan_days$_i$, and can classify the given source node as a periodic scanner if ∀i:scanned_dests_average$_i$ exceeds a second high threshold (e.g., 10, 15, 20, 25, 30, 35) and/or scan_ratio$_i$ exceeds a second low threshold (e.g., 0.10, 0.15, 0.2, 0.25).

For example, if the second high threshold is 30, the first second low threshold is 0.1, and the daily number of destination nodes 66 scanned by a given source node 64 is [0,0,1314,0,0,0], then the given source node is a periodic scanner since scan_days$_i$=1, scanned_dests_average$_i$=1314, and scan_ratio$_i$=0.14.

In one embodiment, processor 48 can receive an input (e.g., from a system administrator) that specifies the first and second low thresholds and the first and the second high thresholds. In another embodiment, processor 48 can dynamically set these thresholds based on the respective distributions of the computed values (i.e., scanned_dests_average$_i$ and scan_ratio$_i$). For example, processor 48 can dynamically set the threshold based on (e.g., a fixed percentage) of outliers in the respective distributions of the computed values.

Returning to the flow diagram, in step 126, processor 48 identifies any of the source nodes in the port scans (i.e., that were identified in step 120) that are not in whitelist 80, and the method ends.

In one embodiment, processor 48 can perform step 128 during any given time period in order to identify a given non-whitelisted source node that performed a port scan during the given time period. In another embodiment, the time periods comprise one or more first time periods followed by a second time period, and processor 48 can perform steps 120-126 on the one or more first time periods, and perform step 128 on the second time period.

Port Profiles

Embodiments described herein can use port profiles to detect potentially malicious port scans. Port profiles indicate which combinations of ports 40 are not likely to be a part of "normal" user activity, but rather part of a network scan. The concept behind port profiles is that there are combinations of ports that are suspicious if they are scanned during a short period of time (e.g., one day). For example, if a legitimate user wants to access a specific network service provided by a given workstation 26 on network 28, the user typically knows what software application is providing the service, and any port(s) 40 the software application is using.

In a first port profile embodiment, the service (also referred to herein as a software category) comprises an operating system. For example, if the user wants to communicate with a given workstation running the Windows™ operating system (produced by Microsoft Corporation, Redmond, Wash.), the user can use port number "3389" which is for the remote desktop protocol (RDP) service. However, if the user tries to communicate with the given workstation via port number "22", then that may be suspicious since port number "22" is typically used by secure shell (SSH) service, which is a service in the Linux™ operating system and rarely exists in Windows™ operating systems.

In a second port profile embodiment, the service comprises database management systems (DBMS). In operation, a first given workstation 26 communicates with a DBMS application executing on a second given workstation 26 via a given port 40 on the second given workstation that is associated with the DBMS application. In this embodiment, a suspicious port scan may comprise the first given workstation communicating with a large number of ports 40 (i.e., on the second given workstation) that are associated with a corresponding large number of different DBMS applications. This type of activity may be caused by an attacker conducting a service enumeration, which, for example, tries to identify all the available DBMS applications on a specific server.

It is important to note that suspicious port scan activity is different in the two embodiments described supra. In the operating system embodiment, a small number of port scans that cross different operating system port groups may be suspicious. This is because a given workstation 26 typically executes a single operating system. However, in the DBMS embodiment, a suspicious port scan may require a large number of port scans that cross different DBMS port scan groups in order to be labeled as suspicious. This is because a given workstation 26 may execute more than one DBMS application.

In the first port profile embodiment, processor 48 can define a plurality of port lists 60 for a corresponding plurality of operating system 42. Each port list 60 comprises multiple port numbers 40 that are commonly used by a given operating system 42. Therefore, each given port list 60 for a given operating system 42 comprises port number 40 that are typically used by the given operating system, and are either never or rarely used by other operating systems 42. Examples of operating systems 42 that can have respective port lists 60 include, but are not limited to Windows™ (produced by Microsoft Corporation, Redmond, Wash.), Linux™, Android™ (produced by Alphabet Inc., Mountain View, Calif.), macOS™ (also known as OS-X™, produced by Apple Inc., Cupertino Calif.).

For example:
A first given port list 60 may include the port numbers "135", "137" and "139". These ports 40 are typically used by Windows™ services.
A second given port list 60 may include the port numbers "22", "23" and "111". These ports 40 are typically used by Linux™ services.

The rationale for defining the port lists in the first port profile embodiment is that an attacker typically does not know the operating system executing on a given workstation 26 that they are scanning, and one goal of the attacker is to identify operating system 42. Therefore, the attacker may scan a few ports 40 from more than one port list 60 in order to identify the operating system executing on the given workstation.

For example, if a first given list 60 comprises ports used by Windows™, a second given 60 comprises ports used by Linux™ and a third given list 60 comprises ports used by macOS™, then for each source node 66 and destination node 66 pair, processor can compute a tuple (N_Windows, N_Linux, N_macOS) that represent respective counts of the port numbers in the port lists that, during a test period (there is no need for a training period) were scanned on the given destination node by the given source node. In this example:

Processor 48 would not flag a tuple like (4,0,0), since the given destination node is probably running Windows™.

Processor 48 would flag a tuple like (4,2,3), since the given source node is trying to access ports 40 that usually used by macOS™ but are rarely used by Windows™.

In some embodiments, processor 48 can use specified thresholds for the mix of counts in the tuples to identify suspicious port scans 32 that "cross" a plurality of operating systems. In a first example, processor 48 can flag the port scans in a given tuple as suspicious if the given tuple indicates a threshold number (e.g., >3, >4 or >5) of scans of ports 40 that are associated with one of the operating systems, and positive numbers of scans of any the ports associated with the remaining operating systems. In another example, processor 48 can flag the port scans in a given tuple as suspicious if the given tuple indicates respective large numbers (e.g., >3, >4 or >5) of scans of ports 40 that are associated with least 2 different operating systems. In the first example, processor can flag a port scan that results in the tuple (4,1,2) as suspicious, and in the second example, the processor can flag the port scan that results in the tuple (0,4,3) as suspicious.

In additional embodiments, processor 48 can transform the tuples into probabilities that the processor can use to identify suspicious port scans. For example, processor 48 can compute probabilities_tuple=[$p_1, p_2, \ldots, p_n$] where $$p_i = \frac{n_i}{\Sigma n_j}, n_i \in \text{ports\_tuple} \tag{3}$$

There may be instances where the port values are small and the probabilities are suspected to be inaccurate. In other words, even though a given port 40 was not previously accessed, its probability of being accessed in the future is not zero. In one embodiment, processor 48 can use methods such as confidence interval or Laplace smoothing in order to improve estimation. In another embodiment, processor 48 can compute an entropy of probabilities_tuple for a given tuple, and flag the port scans in the tuple as suspicious (i.e., in that they are accessing a suspicious combination of the ports in more than one of the sets) if the entropy exceeds a specified threshold (e.g., 0.1, 0.2).

In the second port profile embodiment, processor 48 can define a plurality of port lists 60 for a corresponding plurality of software applications 44. Each port list 60 comprises multiple port numbers 40 that are commonly used by a specific family of software applications 44. Therefore, each given port list 60 for a given software application 44 comprises ports that are typically used by the given software application, and are either never or rarely used by other software applications 44. In the second port profile embodiment, examples of families (also known as categories) of software applications 44 include, but are not limited to, database services, email services and remote access services (also known as remote session services).

For example, if the family of software application 44 comprises database servers, then the port list for the database servers may comprise:

- A first given port list 60 comprises one or more port numbers 40 for MySQL™ (e.g., "3306").
- A second given port list 60 comprises one or more port numbers 40 for Firebird™ (e.g., "1433").
- A third given port list 60 comprises one or more port numbers 40 for PostgreSQL™ (e.g., "5432").
- A fourth given port list 60 comprises one or more port numbers 40 for MongoDB™ (e.g., "27017").
- A fifth given port list 60 comprises one or more port numbers 40 for Cassandra™ (e.g., "9042").
- A sixth given port list 60 comprises one or more port numbers 40 for MemcacheDB™ (e.g., "11211").
- A seventh given port list 60 comprises one or more port numbers 40 for Aerospike™ (e.g., "3100").

Typically a given node (e.g., a given workstation 26 or a server) might execute a small number (e.g., 1-3) different database server engines. Therefore, if processor 48 detects that a given source node 64 is scanning, on a given destination node 66, at least a threshold number (e.g., at least 3, at least 4 or at least 5) of ports 40 from different port lists 60 for database servers, this may indicate that given source node is looking for "any" database server, and therefore does not know which one is executing on the given destination profile. When detecting a large number of ports scanned from different port lists 60 for a given network service, having zero or a few (e.g., less that 2, less than 3 or less than 4) successful sessions can increase suspiciousness.

In some embodiments, processor 48 can use additional criteria such as a number of detected failed connections correlated to different ports 40. In one example, processor 48 can flag (i.e., as suspicious) a port scan that scans a large number (e.g., at least four or at least five) of ports 40 from different port lists 60 for database servers. In another example, processor 48 can flag a port scan that scans a small number (e.g., at least two or at least three) of ports 40 from different port lists 60 for database servers as suspicious wherein at least one of the port scans has a failed connection (as described supra). Note that these examples are typically for port scans that are performed within a short timeframe (e.g., less than one hour, less than two hours or less than three hours).

In a first embodiment, the threshold may comprise a large number such as at least 5, at least 6 or at least 7. In a second embodiment, the threshold may comprise a small number (e.g., at least 2, at least 3 or at least 4) of ports in different port lists, and at least 1 failed connection on any of the port numbers in any of the port lists (i.e., for the family). The port scans in the first and second embodiments are typically within a short time period (e.g., one, two or three hours).

Figure 5:
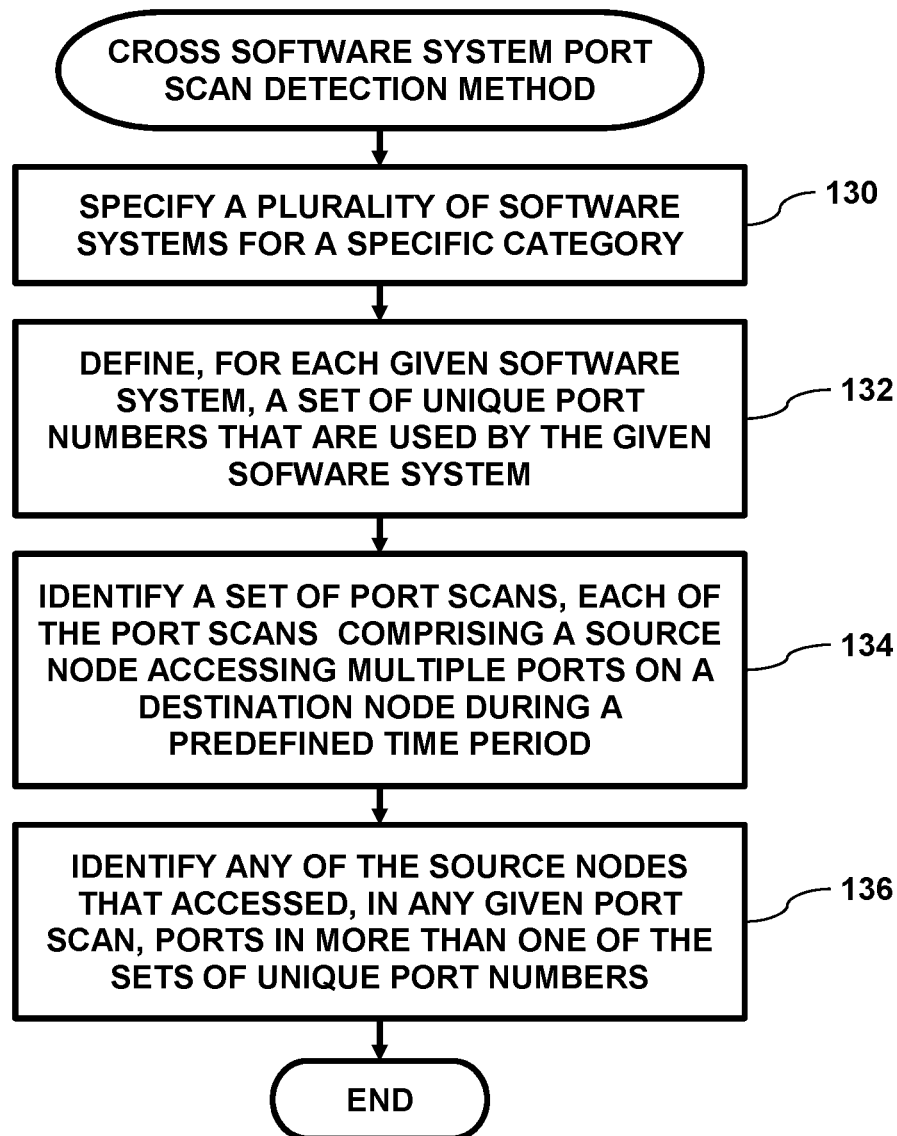
FIG. 5 is a flow diagram that schematically illustrates a method of identifying malicious port scans comprising port scans for different software systems in a single category, in accordance with an embodiment of the present invention.

FIG. 5 is a flow diagram that schematically illustrates a method of using port profiles to detect cross software system port scans, in accordance with an embodiment of the present invention. In step 130, processor 48 defines a plurality of software systems in a specific software category, and in step 132, the system processor defines, for each given software system, a given port list 60 comprising a set of one or more ports 40 that are used exclusively by the given software system. Therefore, each port lists 50 comprise at least first and second disjoint sets of communication ports 40 (i.e., port numbers). The category may comprise operating systems or software applications that provide network services such as database servers or email servers. As described supra, if the family is operating systems, then each port list 60 comprises one or more ports 40 used by an operating system such as Windows™, Linux™ or macOS™. Likewise if the family is DMBS applications, then each port list 60 comprises one or more ports 40 used by a DBMS application such as MySQL™, PostgreSQL™ or Cassandra™.

In step 134, using embodiments described in the description referencing FIG. 2 hereinabove, processor 48 identifies a set of port scans. To identify the set of port scans, processor 48 collects, during a predefined time period (e.g., one hour or one day), communication sessions 68 and aggregates them into aggregated communication sessions 58. Each aggregated communication session 58 comprises a given port scan 32 having a first given workstation 26 accessing at least one given communication port 40 on a second given destination 26.

Finally, in step 136, using embodiments described hereinabove, processor 48 identifies, in the identified port scans (i.e., in step 134), a given source node 64 that accesses at least one of the communication ports in a first port list 60 and at least one of the communication ports in a second port list 60, and the method ends.

Deviation from Independent Model

Embodiments described herein can compute a distribution of port usage in network 28, and use the computed distribution to identify suspicious port scans on the network. For example, during a training period, processor 48 can detect that the port numbers "22" and "3389" are used frequently, but rarely together. During a subsequent test period, if processor 48 detects that a given source node 64 scanned, those two ports 40 on a given destination node 66, then the system processor can generate an alert for the given source node.

Figure 6:
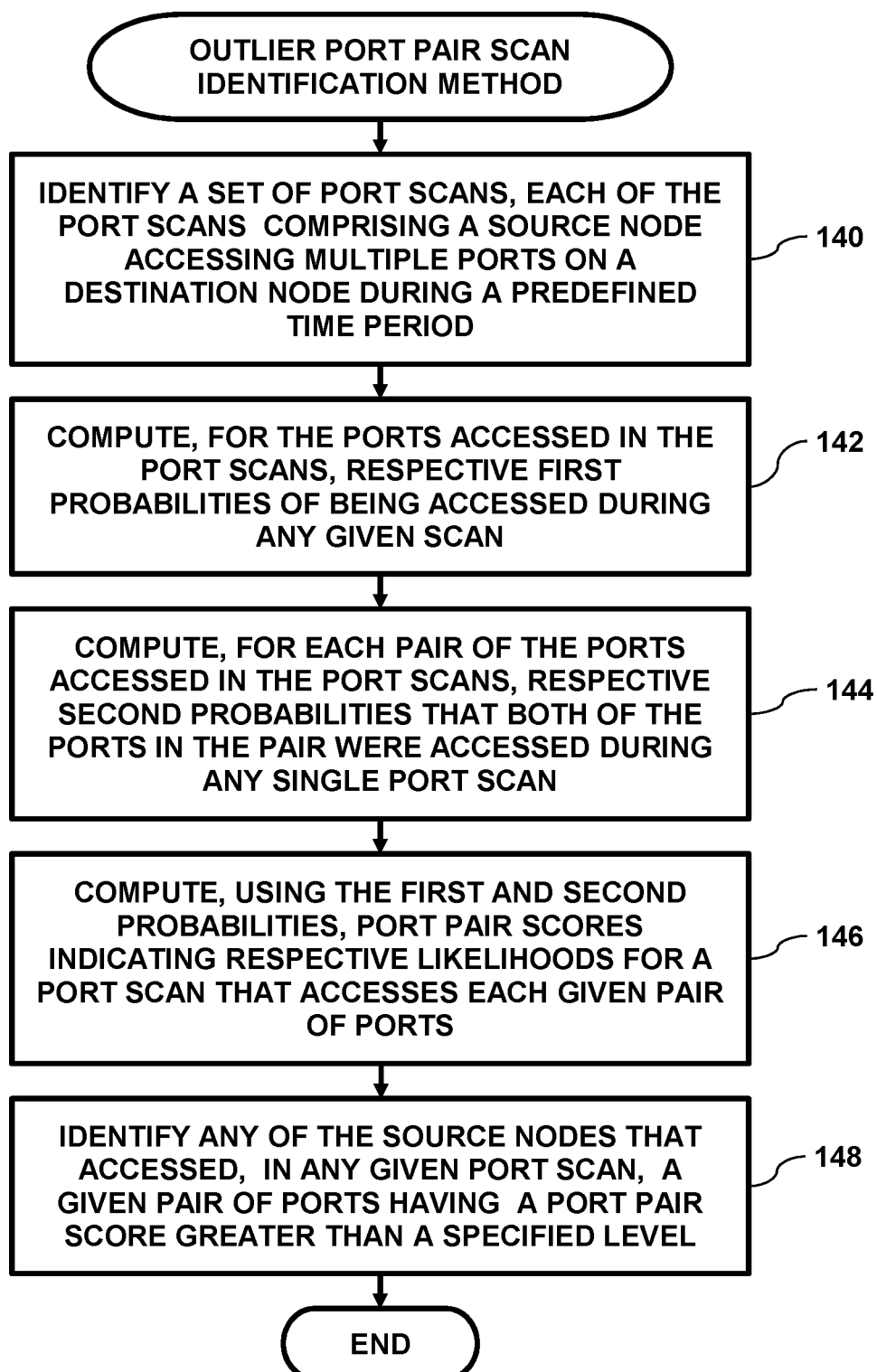
FIG. 6 is a flow diagram that schematically illustrates a method of identifying malicious port scans comprising outlier pairs of scanned ports, in accordance with an embodiment of the present invention.

FIG. 6 is a flow diagram that schematically illustrates a method of detecting port scans 32 comprising outlier pairs of ports 40, in accordance with an embodiment of the present invention. In step 140, using embodiments described in the description referencing FIG. 2 hereinabove, processor 48 identifies a set of port scans. To identify the set of port scans, processor 48 collects, during a predefined time period, communication sessions 68 and aggregates them into aggregated communication sessions 58. Each aggregated communication session 58 comprises a given port scan 32 having a first given workstation 26 accessing at least one given communication port 40 on a second given destination 26.

In step 142, processor 48 computes, for each given port p scanned during the predefined time period, a probability $P_p$ that that a given source node 64 accessed a given port p on a given destination node 66 in any port scan 32 during the predefined time period.

In step 144, processor 48 computes, for each pair of ports p1 and p2, a joint probability $JP_{p1,p2}$ of a connection between a given source node 64 and the ports p1 and p2 on a given destination node 66 in any port scan 32 during the predefined time period.

Upon computing $JP_{p1,p2}$ for each pair of ports 40 that were scanned during the training period, in step 146, processor 48 computes a Port Pair Score (PPS) that the system processor can use to identify pairs of ports p1 and p2 that have the following characteristics:

Port p1 is scanned frequently by any given source node 64 during the predefined time period.

Port p2 is scanned frequently by any given source node 64 during the predefined time period.

A given source node 64 rarely scans both ports p1 and p2 on a given destination node 66 during the predefined time period.

To compute the Port Pair Score, processor 48 can use the following formula $$PPS_{p1,p2} = \frac{P_{p1} * P_{p2}}{JP_{p1,p2}} * (1 - |P_{p1} - P_{p2}|) \quad (3)$$

In Equation (3), higher PPS scores indicate a pair of ports 40 that are (each) frequently scanned on the network, but are rarely scanned together on a given destination node 66 by a given source node 64 during the predefined time period. In embodiments of the present invention, the threshold for a high PPS score can be a high value. For example the threshold can be greater than 20, greater than 30 or greater than 40.

Finally, in step 148, processor 48 identifies any of the source nodes that, during the predefined time period, scanned a pair of ports 40 having a high Port Pair Score, and the method ends. In embodiments of the present invention, a scanned a pair of ports 40 having a high Port Pair Score indicates that respective $JP_{p1,p2}$ for the pair of ports p1 and p2 is lower than a threshold dependent upon the respective probabilities $P_p$ of ports p1 and p2.

In one embodiment, the predefined time period may comprise multiple sub-periods that may have substantially identical time durations. In this embodiment, processor 48 can perform step 150 during any given sub-period in order to identify a given source node 64 that, during the given sub-period, scanned a pair of ports 40 having a high Port Pair Score. In another embodiment, the sub-periods comprise one or more first sub-periods followed by a second sub-period, and processor 48 can perform steps 140-146 on the one or more first sub-periods, and perform step 148 on the second sub-period.

Scanner Probes

Some scanning tools use a port scanning probe that comprises a given software application 44 loaded on one or more nodes 26 and is configured to scan other nodes 26 on the network, and to report results of a scan to a scanning server (e.g., a given node 26). Scanning probes can be deployed in networks having nodes 26 that the scanning server cannot access directly with all the ports required for the scan (e.g., due to a firewall protecting a subset of the network). In operation, probes can be deployed on numerous network endpoints (i.e., nodes 26) to randomly perform port scans, and then transmit results of the scans back to a given node (i.e., a server). Since scans performed by scanner probes may generate alerts, embodiments of the present invention enable processor 48 to whitelist scans performed by a given scanner probe.

Figure 7:
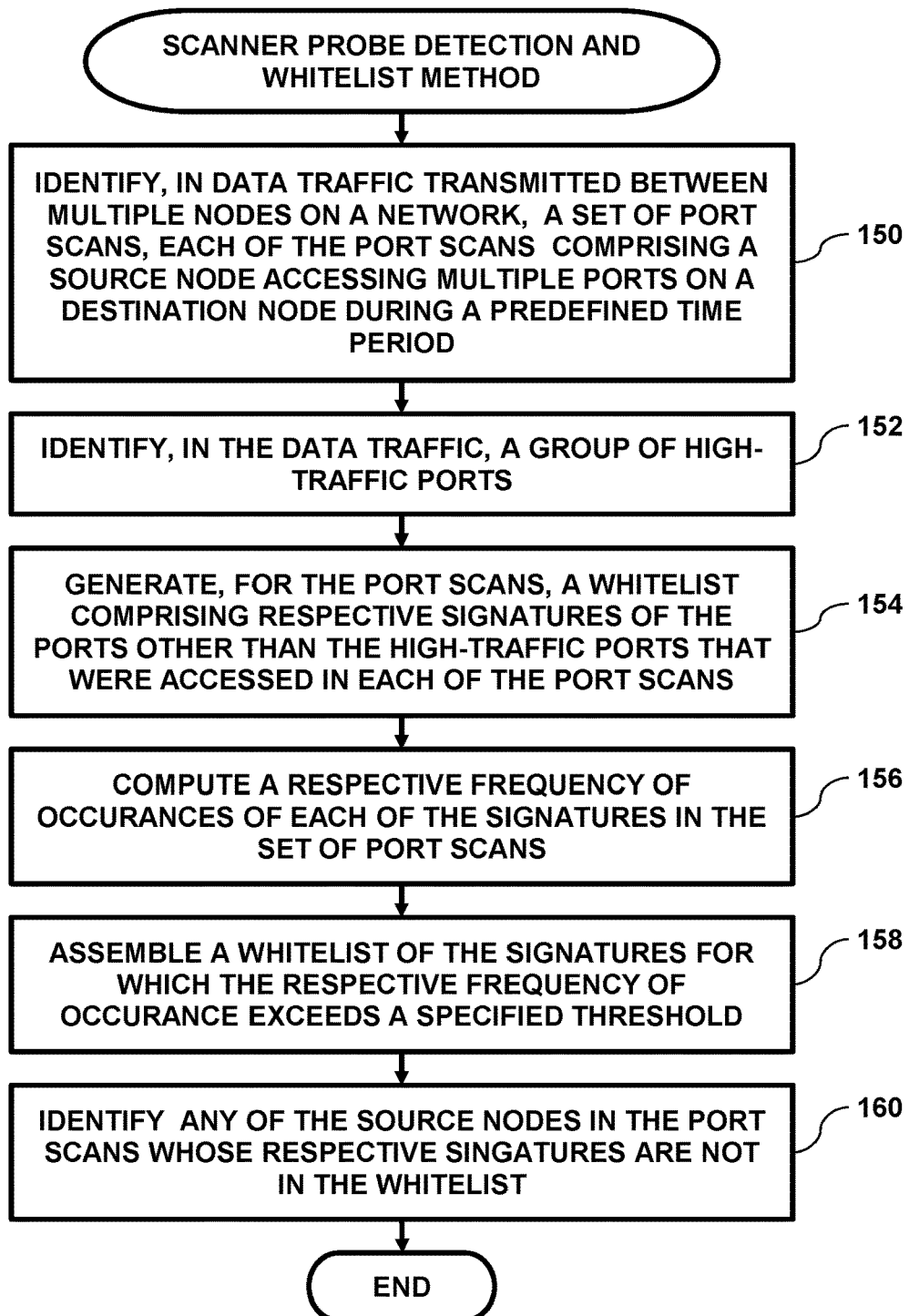
FIG. 7 is a flow diagram that schematically illustrates a method of identifying and whitelisting scanner probes, in accordance with an embodiment of the present invention.

FIG. 7 is a flow diagram that schematically illustrates a method detecting any deployed scanner probes, in accordance with an embodiment of the present invention. In step 150, using embodiments described in the description referencing FIG. 2 hereinabove, processor 48 identifies a set of port scans. To identify the set of port scans, processor 48 collects, during a predefined time period, communication sessions 68 and aggregates them into aggregated communication sessions 58. Each aggregated communication session 58 comprises a given port scan 32 having a first given workstation 26 accessing at least one given communication port 40 on a second given destination 26.

In step 152, processor 48 identifies, in the identified port scans, a group of high traffic ports 40. In embodiments of the present invention, processor 48 can classify a given port 40 as having high traffic if the amount data traffic passing through the given port during the predefined time period exceeds a predefined threshold. Examples of predetermined thresholds include, but are not limited to 200, 400 and 600 bytes. In some embodiments, the given port can be on a given node 26. In other words processor 48 can classify the combination of the given node and the given port as having high traffic.

In operation, processor 48 can use volume 88 and/or rvolume in the communication sessions of the aggregated port scan (i.e., corresponding to a given port scan 32) to determine if the data traffic in a given port scan 32 exceeds the predefined threshold. In some embodiments, processor 48 can classify a given port 40 as having high traffic if the maximum amount of data passing through the given port in any given communication session (i.e., during a given port scan 32) exceeds the predefined threshold.

In step 154, processor 48 generates, for the identified port scans, respective signatures 82 indicative of the communication ports other than the high-traffic ports that were accessed in each of the port scans. In other words, a given signature 82 for a given port scan 32 may comprise a set of the communication ports that were accessed during the given port scan and that were not classified as having high traffic.

In step 156, processor 48 computes a respective frequency of occurrence of each of the signatures over the set of the port scans, and in step 158 the processor assembles whitelist 80 by initializing the whitelist and then adding, to the whitelist, the signatures for which the respective frequency of occurrence is greater than a predefined threshold. In one embodiment, the frequency of occurrence for a given signature 82 may include information such as:

A number of occurrences that the given signature appeared in all the identified port scans.

A number of sources that performed port scans 32 having identical signatures 82 (i.e. the set of non-high volume ports) to the given signature.

A number of destinations having a set of ports that were scanned identical to the set of ports in the given signature.

In this embodiment, examples of specific thresholds include, but are not limited to:

The number of occurrences>a first threshold such as 8, 10 or 12.

The number of sources>a second threshold such as 0, 1 or 2.

The number of sources<a third threshold such as 30, 40 or 50.

The number of destinations>a fourth threshold such as 0, 1, 2 or 3.

The number of destinations<a fifth threshold such as 10, 20, 30 or 40

In some embodiments, processor 48 can use a combination of the thresholds to identify the signatures to add to the whitelist. For example, a given combination may be:

Number of occurrences>10 AND

Number of sources>1 AND

Number of sources<40 AND

Number of destinations>2 AND

Number of destinations<20.

Finally, in step 160, processor 48 identifies any of the source nodes in the identified port scans having respective signatures not in the whitelist, and the method ends.

In one embodiment, the predefined time period may comprise multiple sub-periods that may have substantially identical time durations. In this embodiment, processor 48 can perform step 160 during any given sub-period in order to identify, in the given sub-period, a identified port scan 32 having respective signatures not in the whitelist. In another embodiment, the sub-periods comprise one or more first sub-periods followed by a second sub-period, and processor 48 can perform steps 150-158 on the one or more first sub-periods, and perform step 160 on the second sub-period.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:

defining, for a given software category, respective, disjoint sets of logical communication port numbers that are used by each of a corresponding plurality of software systems in the given software category, including at least first and second disjoint sets having corresponding first and second software systems, wherein the first set comprises one or more logical communication port numbers used by the first software system and rarely or never used by the second software system, and wherein the second set comprises one or more logical communication port numbers used by the second software system and rarely or never used by the first software system;

identifying, in data traffic transmitted between multiple nodes that communicate over a network, a set of port scans, each of the port scans comprising an access, in the data traffic, of a plurality of the logical communication port numbers on a given destination node by a given source node during a predefined time period, wherein identifying the port scans comprises:

identifying, in the data traffic, a set of pairs of the source and the destination nodes, each pair consisting of a given source node and a given destination node, and one or more of the logical communication port numbers accessed in the data traffic between the source and destination nodes in each pair, computing, for each pair in the set, a respective baseline level that is indicative of a first number of the logical communication port numbers that source nodes other than the given source node in the pair accessed on the given destination node during a first time period, computing, for each pair in the set, a respective test score that is indicative of a difference between a second number of the logical communication port numbers that the given source node in the pair accessed on the given destination node during a second time period and the baseline level, and designating any of the pairs for which the test score is greater than a specified level as the port scans; and upon detecting a suspicious port scan comprising accesses, by one of the source nodes on one of the destination nodes, of at least one of the logical communication port numbers in the first set and at least one of the logical communication port numbers in the second set, initiating a preventive action.

2. The method according to claim 1, wherein detecting accesses of at least one of the logical communication port numbers in the first set comprises detecting accesses of at least a specified number of the logical communication port numbers in the first set, wherein the specified number is greater than one.

3. The method according to claim 1, wherein the at least one of the logical communication port numbers in the first set and at least one of the logical communication port numbers in the second set comprise at least a specified number of the logical communication port numbers in each of the first and the second sets, wherein the specified number is greater than one.

4. The method according to claim 1, wherein the given software category comprises operating systems, and wherein the suspicious port scan comprises accesses of at least one logical communication port number used by a first operating system and at least one logical communication port number used by a second operating system.

5. The method according to claim 1, wherein the given software category comprises database servers, and wherein the suspicious port scan comprises accesses of at least one logical communication port number used by a first database server and at least one logical communication port number used by a second database server.

6. The method according to claim 1, wherein the given software category comprises email servers, and wherein the suspicious port scan comprises accesses of at least one logical communication port number used by a first email server and at least one logical communication port number used by a second email server.

7. The method according to claim 1, wherein the given software category comprises remote session applications, and wherein the suspicious port scan comprises accesses of at least one logical communication port number used by a first remote session application and at least one logical communication port number used by a second remote session application.

8. The method according to claim 1, wherein initiating the preventive action comprises generating an alert for the given source node in the detected port scan.

9. The method according to claim 1, wherein initiating the preventive action comprises restricting access of the given source node in the detected port scan to the network.

10. An apparatus, comprising:

a network interface device coupled to a data network comprising multiple nodes that communicate via the network; and at least one processor configured:

to define, for a given software category, respective, disjoint sets of logical communication port numbers that are used by each of a corresponding plurality of software systems in the given software category, including at least first and second disjoint sets having corresponding first and second software systems, wherein the first set comprises one or more logical communication port numbers used by the first software system and rarely or never used by the second software system, and wherein the second set comprises one or more logical communication port numbers used by the second software system and rarely or never used by the first software system, to identify, in data traffic transmitted between multiple nodes that communicate over a network, a set of port scans, each of the port scans comprising an access, in the data traffic, of a plurality of the logical communication port numbers on a given destination node by a given source node during a predefined time period, wherein a given processor is configured to identify the port scans by:

identifying, in the data traffic, a set of pairs of the source and the destination nodes, each pair consisting of a given source node and a given destination node, and one or more of the logical communication port numbers accessed in the data traffic between the source and destination nodes in each pair, computing for each pair in the set, a respective baseline level that is indicative of a first number of the logical communication port numbers that source nodes other than the given source node in the pair accessed on the given destination node during a first time period, computing, for each pair in the set, a respective test score that is indicative of a difference between a second number of the logical communication port numbers that the given source node in the pair accessed on the given destination node during a second time period and the baseline level, and designating any of the pairs for which the test score is greater than a specified level as the port scans, and upon detecting a suspicious port scan comprising accesses, by one of the source nodes on one of the destination nodes, of at least one of the logical communication port numbers in the first set and at least one of the logical communication port numbers in the second set, to initiate a preventive action.

11. The apparatus according to claim 10, wherein a given processor is configured to detect accesses of at least one of the logical communication port numbers in the first set by detecting accesses of at least a specified number of the logical communication port numbers in the first set, wherein the specified number is greater than one.

12. The apparatus according to claim 10, wherein the at least one of the logical communication port numbers in the first set and at least one of the logical communication port numbers in the second set comprise at least a specified number of the logical communication port numbers in each of the first and the second sets, wherein the specified number is greater than one.

13. The apparatus according to claim 10, wherein the given software category comprises operating systems, and wherein the suspicious port scan comprises accesses of at least one logical communication port number used by a first operating system and at least one logical communication port number used by a second operating system.

14. The apparatus according to claim 10, wherein the given software category comprises database servers, and wherein the suspicious port scan comprises accesses of at least one logical communication port number used by a first database server and at least one logical communication port number used by a second database server.

15. The apparatus according to claim 10, wherein the given software category comprises email servers, and wherein the suspicious port scan comprises accesses of at least one logical communication port number used by a first email server and at least one logical communication port number used by a second email server.

16. The apparatus according to claim 10, wherein the given software category comprises remote session applications, and wherein the suspicious port scan comprises accesses of at least one logical communication port number used by a first remote session application and at least one logical communication port number used by a second remote session application.

17. The apparatus according to claim 10, wherein a given processor is configured to initiate the preventive action by generating an alert for the given source node in the detected port scan.

18. The apparatus according to claim 10, wherein a given processor is configured to initiate the preventive action by restricting access of the given source node in the detected port scan to the network.

19. A computer software product, the product comprising a non-transitory computer-readable medium, in which program instructions are stored, which instructions, when read by a computer, cause the computer:

to define, for a given software category, respective, disjoint sets of logical communication port] numbers that are used by each of a corresponding plurality of software systems in the given software category, including at least first and second disjoint sets having corresponding first and second software systems, wherein the first set comprises one or more logical communication port numbers used by the first software system and rarely or never used by the second software system, and wherein the second set comprises one or more logical communication port numbers used by the second software system and rarely or never used by the first software system;

to identify, in data traffic transmitted between multiple nodes that communicate over a network, a set of port scans, each of the port scans comprising an access, in the data traffic, of a plurality of the logical communication port numbers on a given destination node by a given source node during a predefined time period, wherein the computer program product is configured to identify the port scans by:

identifying, in the data traffic, a set of pairs of the source and the destination nodes, each pair consisting of a given source node and a given destination node, and one or more of the logical communication port numbers accessed in the data traffic between the source and destination nodes in each pair, computing, for each pair in the set, a respective baseline level that is indicative of a first number of the logical communication port numbers that source nodes other than the given source node in the pair accessed on the given destination node during a first time period, computing, for each pair in the set, a respective test score that is indicative of a difference between a second number of the logical communication port numbers that the given source node in the pair accessed on the given destination node during a second time period and the baseline level, and designating any of the pairs for which the test score is greater than a specified level as the port scans; and upon detecting a suspicious port scan comprising accesses, by one of the source nodes on one of the destination nodes, of at least one of the logical communication port numbers in the first set and at least one of the logical communication port numbers in the second set, to initiate a preventive action.

* * * * *